United States Patent

Gray

[11] Patent Number: 5,980,501
[45] Date of Patent: Nov. 9, 1999

[54] RESERVOIRS AND DELIVERY DEVICES

[75] Inventor: John M Gray, Wetherby, United Kingdom

[73] Assignee: Zeneca Limited, London, United Kingdom

[21] Appl. No.: 08/860,381

[22] PCT Filed: Nov. 1, 1995

[86] PCT No.: PCT/GB95/02564

§ 371 Date: May 2, 1997

§ 102(e) Date: May 2, 1997

[87] PCT Pub. No.: WO96/14043

PCT Pub. Date: May 17, 1996

[30] Foreign Application Priority Data

Nov. 2, 1994 [GB] United Kingdom ............... 9422082

[51] Int. Cl.$^6$ ........................................ A61B 19/00
[52] U.S. Cl. ............................... 604/408; 128/DIG. 24
[58] Field of Search .................. 604/65–67, 30, 604/31, 891.1, 20, 257, 403, 404, 408; 128/DIG. 12, 13, DIG. 24; 607/60, 156

[56] References Cited

U.S. PATENT DOCUMENTS

| | | |
|---|---|---|
| 3,809,871 | 5/1974 | Howard et al. . |
| 4,270,532 | 6/1981 | Franetzki et al. . |
| 4,282,872 | 8/1981 | Franetzki et al. . |
| 4,469,481 | 9/1984 | Kobayashi . |
| 4,510,489 | 4/1985 | Anderson, III et al. . |
| 4,510,490 | 4/1985 | Anderson, III et al. . |
| 4,560,979 | 12/1985 | Rosskopf . |
| 4,741,736 | 5/1988 | Brown . |
| 4,871,351 | 10/1989 | Feingold ............................ 604/66 |
| 4,886,495 | 12/1989 | Reynolds . |
| 5,053,774 | 10/1991 | Schuermann et al. ............ 342/44 |
| 5,078,683 | 1/1992 | Sancoff et al. .................. 604/67 |
| 5,242,408 | 9/1993 | Jhuboo . |
| 5,254,096 | 10/1993 | Rondelet et al. . |
| 5,376,070 | 12/1994 | Purvis et al. ..................... 604/67 |
| 5,383,858 | 1/1995 | Reilly et al. . |
| 5,429,401 | 7/1995 | Leslie et al. . |
| 5,569,186 | 10/1996 | Lord et al. ....................... 604/67 |
| 5,569,187 | 10/1996 | Kaiser .............................. 604/67 |
| 5,697,951 | 12/1997 | Harpstead et al. ............ 604/891.1 |

FOREIGN PATENT DOCUMENTS

| | | |
|---|---|---|
| 2 266 641 | 10/1975 | France . |
| 2 55 744 | 5/1985 | France . |
| 93 08 204 | 8/1993 | Germany . |
| 76107449 | 11/1990 | Taiwan . |
| 89/08264 | 9/1989 | WIPO . |
| WO 91/00307 | 1/1991 | WIPO . |
| WO 91/04759 | 4/1991 | WIPO . |
| 92/12402 | 7/1992 | WIPO . |
| WO 93/02720 | 2/1993 | WIPO . |
| WO 94/12235 | 6/1994 | WIPO . |

OTHER PUBLICATIONS

Graseby 3100 Syringe Pump, Graseby Medical Ltd., A Cambridge Electronic Industries Company, England, 2 pages.

50 Ways to Touch Memory, Second Edition, Dallas Semiconductor, Dallas, Texas, Oct. 1992, pp. 1–26.

*Primary Examiner*—Wynn Wood Coggins
*Assistant Examiner*—Sharon Finkel
*Attorney, Agent, or Firm*—Cushman Darby & Cushman; Intellectual Property Group of Pillsbury Madison & Sutro, LLP

[57] ABSTRACT

A passive reservoir for medicament in the form of a plastics bag 1, has a hanging eyelet 2 at its upper end and a lower outlet nozzle 3. The plastics bag 1 has bottom corners 4,5, the left-hand right-angled corner 5 of which encapsulates a data carrier means 6 which carries data relating to a medicament contained or to be contained within the bag 1. The data carrier means is in the form of an electrically and/or magnetically operable device which can emit the data it is carrying in response to activation by a suitable field applied by an external reading device, which can cooperate with a delivery device to control the delivery to a patient of medicament when contained in the bag 1.

22 Claims, 7 Drawing Sheets

RESERVOIRS AND DELIVERY DEVICES

This application is the national phase of international application PCT/GB95/02564, filed Nov. 1, 1995 which designated the U.S.

FIELD OF THE INVENTION

This invention relates to reservoirs and delivery devices and more particularly, but not necessarily exclusively, to such reservoirs and delivery devices applied to the delivery of medicament to medical patients.

BACKGROUND OF THE INVENTION

Large volume infusions of medicaments are regularly given by microprocessor-controlled delivery devices such as infusion pumps, delivering the medicament from a passive reservoir such as a vial, bottle, collapsible bag or pre-filled cassette.

A passive reservoir is not subjected to positive pressure in use, and is associated in use with a delivery device applied to a patient supply line leading from the passive reservoir. Such delivery devices are many and varied and include peristaltic pumps and reciprocating pumps, both of which apply positive pressure on the patient supply line and not on the passive reservoir itself.

Also a delivery device in the form of a drip feed controller may control delivery of the medicament in the patient supply line, based on an electronic count of drips of medicament produced from the passive reservoir simply under the force of gravity.

The present invention is not limited to any particular form of passive reservoir or delivery device, although it is preferably, but not necessarily, applicable to pre-filled passive reservoirs for medicament, i.e. those filled and marketed by the pharmaceutical medicament manufacturer.

A non-limiting example of such a reservoir would be a pre-filled collapsible plastics bag, of the type often suspended from a stand in use in a hospital ward, to take advantage of gravitational force in delivering medicament from the bag.

Further non-limiting examples of such reservoirs are bottles and large vials, each of which are often suspended from a stand for use in a hospital ward or operating theatre. In each case the medicament may be sucked from the reservoir or may flow out under gravity. These systems comprising bottles or vials will require air to be entrained, usually through a bacterial filter, in use.

Yet further non-limiting examples of such reservoirs are cassettes or cartridges (optionally pre-filled with medicament). Such reservoirs may be suspended from a stand for use in a hospital ward or operating theatre. In an alternative they may be used in ambulatory devices for infusion of, for example, chemotherapeutic agents, insulin or agents for control of pain.

Conventionally, a passive reservoir of whatever type is filled by the pharmaceutical company and supplied to a hospital where the reservoir is connected to the delivery device by a doctor or nurse. The delivery device comprises a computer control means for controlling the medicament flow and comprising a keyboard and display means. The doctor or nurse can program the computer control means through the keyboard, setting for example the flow rate, duration of the infusion, or the maximum volume to be delivered.

SUMMARY OF THE INVENTION

It is an object of the present invention to provide with a passive reservoir for medicament, which preferably but not essentially is pre-filled as described hereinbefore, a data carrier means to carry data relating to a medicament contained, or to be contained, in the reservoir, which data carrier means can be read by a suitably adapted delivery device to take into account the data carried. The data carrier means may be present with the reservoir when it is sold by the manufacturer of the medicament and/or the reservoir to a hospital or pharmacist for example, which is particularly advantageous when the reservoir is a pre-filled reservoir.

According to a first aspect of the present invention there is provided a passive reservoir for medicament, having data carrier means therewith to carry data relating to a medicament contained or to be contained in the reservoir, wherein the data carrier means comprises an electrically and/or magnetically operable device to emit data it is carrying in response to activation by a suitable field applied by an external means.

The passive reservoir may be a collapsible bag as already mentioned. Such bags may hold up to a liter of medicament, or possibly more.

Such bags often contain merely saline solution, or other solutions for intravenous administration. It is to be understood that in the present patent application the term "medicament" is to include within its scope any formulation for intravenous administration to a patient in need thereof.

According to a second aspect of the present invention there is provided a delivery device cooperable with a passive reservoir according to the first aspect of the present invention, and comprising activation means to emit a field suitable to cause the electrically and/or magnetically operable device with the passive reservoir to emit data it is carrying, the delivery device further comprising receiving means for receiving the data emitted, actuating means for controlling the delivery to a patient of medicament when contained in the passive reservoir, and control means coupled to said receiving means and to said actuating means to operate the latter taking into account data received from the data carrier means by the receiving means.

According to a third aspect of the present invention there is provided a passive reservoir according to the first aspect of the present invention when operably coupled with a delivery device according to the second aspect of the present invention.

According to a fourth aspect of the present invention there is provided a method for automatically identifying a medicament or a property of a medicament, comprising providing with a passive reservoir which contains or is to contain the medicament, data carrier means comprising an electrically and/or magnetically operable device to emit data it is carrying, and identifying said medicament or said property thereof, in response to activation by a suitable field applied by an external means.

According to a fifth aspect of the present invention there is provided a reading device which is applicable to a passive reservoir according to the first aspect of the present invention in order to read the data carrier means thereof, the reading device comprising at least a part of activation means to emit a field suitable to cause the electrically and/or magnetically operable device to emit data it is carrying, and at least a part of receiving means for receiving the data thus emitted.

A reading device according to the fifth aspect of the present invention may comprise a mobile clip to be electrically coupled to a delivery device, and able to be clipped onto the passive reservoir. This embodiment is preferable where the passive reservoir is a collapsible bag, and the clip may be attached for example to a corner of the collapsible bag.

In other embodiments where the passive reservoir is a rigid cylindrical container such as a vial or bottle, or is a cassette or cartridge, the reading device could take some other appropriate form in dependence upon the location of the data carrier means on the reservoir.

Passive reservoirs according to the first aspect of the present invention may be manufactured and sold, preferably pre-filled, in large numbers to hospitals, and possibly also pharmacists.

The data carried by the data carrier means may identify the medicament and/or its concentration. There need be no application to the passive reservoir of dosage data and the like, which can be programmed into the delivery device at the point of use depending upon the particular patient's requirements. However, it is possible to incorporate such data in the data carrier means if desired.

When a passive reservoir according to the invention is coupled to a cooperable delivery device, the medicament-related data may be transferred automatically or on request to the control means of the delivery device. This data may comprise an identification of the medicament contained within the reservoir, and/or its concentration, as already stated. Other medicament-related data could be employed alternatively or in addition, for example batch number and expiry date.

Since the reservoir-mounted data need not be entered to the delivery device via a keyboard for example, the responsibilities of the delivery device operator can be reduced as regards the information to be inputted, and the data carrier means can operate as a recognition device to ensure that the correct reservoir is coupled to the delivery device for the particular application concerned. This eliminates incorrect, and possibly dangerous, administration as a result of operator error.

Various types of device can be used as the data carrier means in embodiments of the present invention. Preferred embodiments may employ electrically and/or magnetically resonant systems, for example a magnetostrictive system wherein the data carrier device comprises one or more strips of magnetically biased material, which will mechanically resonate when activated by an external source of a magnetic field. The resonance will be detected by the receiving means, the value of the resonant frequency detected supplying an item of data.

Alternatively, an electronic transponder could be used which outputs data bits when activated by a field in the form of an interrogating power burst via one or more antennae in the activation means.

As far as the magnetostrictive embodiments are concerned, single magnetic strips may provide respective discrete bits of information corresponding to their individual fundamental resonant frequencies, or a single magnetic strip can be magnetised to respond to its fundamental resonant frequency and also, or alternatively, to harmonics of that fundamental resonant frequency.

Preferably a data carrying device is mounted on or in a projection or other part of the passive reservoir, for example in a corner of a collapsible bag.

When the reservoir is coupled with a cooperable delivery device, the projection may be engaged by a reading device to cooperate with an activation means and receiving means within the body of the reading device.

An advantage with the activatable proposed embodiments of the present invention may be that relative movement need not be taking place between the data carrier and the receiving means for the data to be read, leading to good reading reliability. Moreover the optical cleanliness required with a device such as a bar code reader, for example of a window through which a scanner sees the bar code, is not a problem. Extraneous matter could in principle however interfere with efficient operation of a bar code reader. Moreover, in an optical system the bar code would have to be accurately positioned to align with the reader. Finally, an optical bar code system may be capable of being misused, and may not provide the required safety.

Preferred embodiments of the present invention require no relative movement during reading, leading to reliability, simplicity and convenience in operation.

For a better understanding of the present invention and to show how it may be put into effect, reference will now be made, by way of example, to the accompanying drawings in which:

DETAILED DESCRIPTION OF THE PREFERRED EMBODIMENTS

Figures 1, 2:
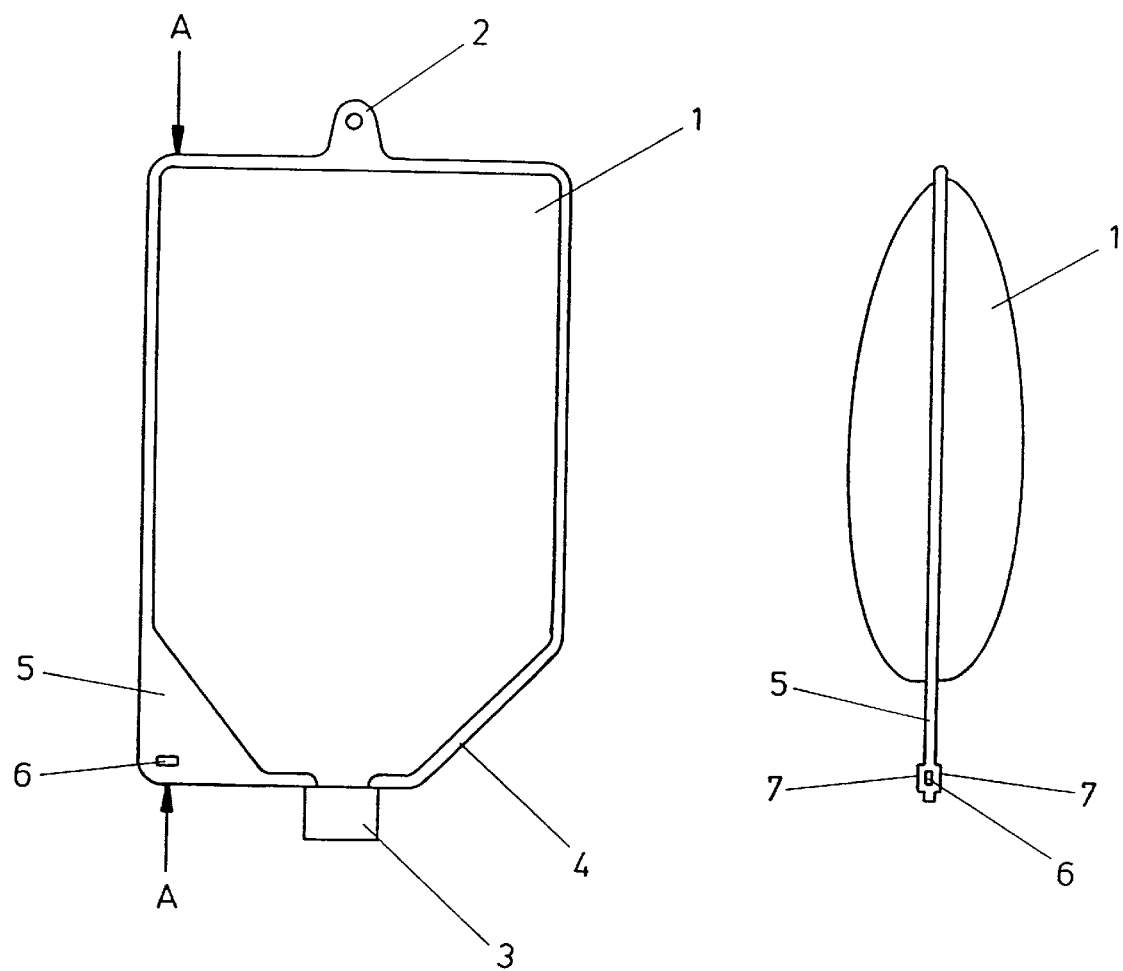
FIG. 1 shows a passive reservoir for medicament according to the first aspect of the present invention.
FIG. 2 shows the passive reservoir of FIG. 1 in section along line A—A thereof.

FIG. 1 shows a passive reservoir for medicament, in the form of a collapsible transparent plastics bag 1. The plastics bag is sealed around its outer edge and is pre-filled with medicament such as saline solution or such as the intravenous cardiotonic agent "dopamine".

The bag is formed with an eyelet 2 at its upper end for hanging the bag on a medical stand, and is provided with an outlet nozzle 3 at its lower end which is to be pierced by a sharp end of a patient supply line.

Collapsible bags of this nature are well-known conventionally, and may have two angular bottom corners such as the right-hand bottom corner 4 shown in FIG. 1. This creates a funnel effect towards the outlet nozzle 3. As medicament leaves the bag, the bag collapses in upon itself so that its volume is reduced accordingly.

In alternative embodiments wherein the reservoir is a rigid vessel such as a bottle, it will be necessary to allow air into the bottle to occupy the internal volume left by medicament leaving the bottle.

Conventionally the outer part of each bottom corner is missing as shown at corner 4, but in the present embodiment a left-hand right-angled corner 5 is retained as part of the seal of the bag, in order to incorporate a data carrier means in the form an electrically (including electronically) or magnetically operable device 6. More details of this device 6 will be provided hereinafter.

FIG. 2 shows the bag of FIG. 1 in section along line A—A and shows that the data carrier device 6 is encapsulated in the plastics corner 5 of the bag 1, with the usually thin cross-section of the seal (including corner 5) around the edge of the bag 1 being enlarged to accommodate the data carrier device 6. Thus front and rear circular projections 7 are provided on the corner 5 at front and rear sides of the data carrier device 6.

Although the present invention has been particularly described and illustrated in FIGS. 1 and 2 with reference to a pre-filled collapsible bag, it is to be appreciated that the bag or other passive reservoir need not be pre-filled for example by the manufacturer, but could be filled for example within a hospital. Thus, the present invention is intended also to cover embodiments of passive reservoirs for medicaments wherein there is no medicament in the reservoir initially, but wherein it is intended to fill the reservoir with a particular medicament identified by the data carrier device 6 which is mounted on the reservoir during its manufacture or possibly later.

Turning now to the details of the data carrier device 6, the possibility has already been mentioned of employing a transponder cooperable with a suitable activation means and receiving means. Such systems are available in a variety of packages for other applications and are commercially available from, for example, the company Texas Instruments and are known under the title Texas Instruments Registration and Identification Systems (TIRIS).

Figure 3:
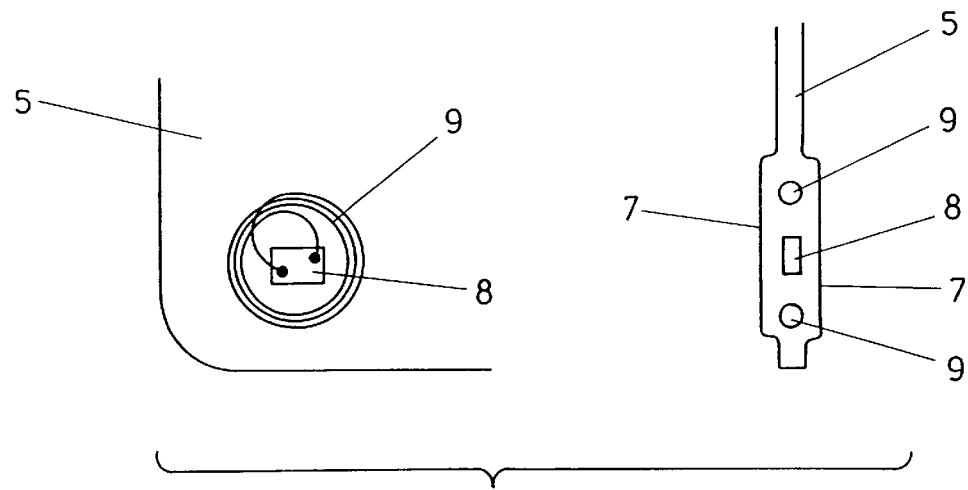
FIG. 3 shows one embodiment of a corner of the reservoir of FIGS. 1 and 2.

FIG. 3 shows in side view and section how a transponder 8 mounted on a chip carrier may be connected to an aerial coil 9 and encapsulated within the bag corner 5. Upon receipt of power at an appropriate frequency by the aerial coil 9, the transponder 8 will emit its pre-programmed data from the same aerial coil 9.

Figure 4:
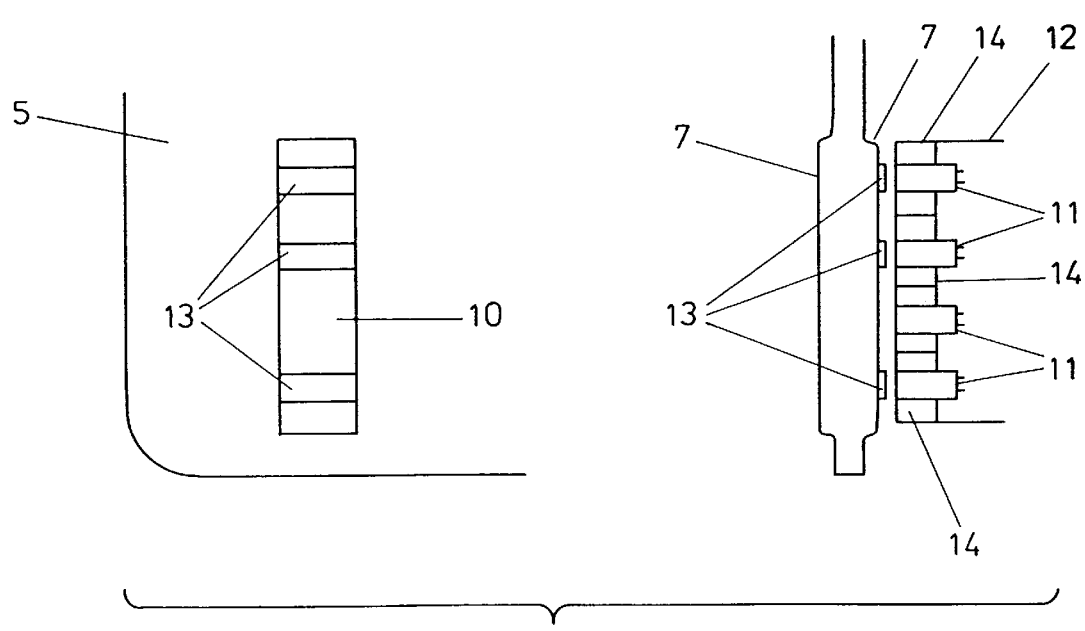
FIG. 4 shows an alternative embodiment of a corner of the reservoir of FIGS. 1 and 2.

A further system, shown in FIG. 4, for tagging the bag is envisaged that utilises a magnetic ink bar code on a label 10, and Hall effect transducers 11 mounted within a reader 12. Magnetic ink bars 13 are printed on the label 10 such that when the reader 12 (shown in section) is applied to the corner 5 the ink bars 13 lie adjacent to the transducers 11 mounted within the reader 12.

The transducers are composed of Hall effect devices mounted within electromagnets 14. The common magnetic inks, such as those found on bank cheques, behave as soft magnets and may not be relied upon to retain magnetism for long periods. To read the magnetic label described, the label is first magnetised by energising the electromagnets 14 wound around each sensor. This produces a magnetic field to activate the magnetic ink bars 13. The current within the electromagnets 14 is reduced to zero and the magnetic flux produced by the remnant magnetism within the ink bars 13 is sensed by the Hall effect devices opposite each ink bar. The presence and absence of magnetic bars 13 may be used to denote the medicament type and concentration.

The sensor system does not have to utilise Hall effect transducers. Alternative technologies are becoming available such as thick film transducers that utilise magnetoresistive properties of materials.

Alternatively, as a result of a search for other technologies applicable to automatic passive reservoir identification as just described, systems have emerged that utilise electrical or magnetic resonance. An electrically resonant circuit composed of inductance and capacitance will have a resonant frequency $$\frac{1}{2\pi\sqrt{LC}}$$

where L is the inductance of the circuit and C its capacitance. In an embodiment arranged similarly to that of FIG. 3, an inductor 9 is wound as an aerial coil and connected to each end of a chip capacitor 8, instead of a transponder as previously described with reference to FIG. 3. The inductor 9 may be conductive ink printed on a carrier film suitable for moulding into the bag corner 5, or may be insulated wire as shown in the cross-sectional part of FIG. 3.

In this embodiment activation means will scan the frequencies of interest by transmitting power from an aerial positioned at the corner 5. At the resonant frequency of the circuit within the corner 5, the effective impedance of the transmitter aerial will fail substantially. The fall in impedance can be detected and the frequency of resonance measured. The control system of a delivery device may thus identify the drug type and concentration by the resonant frequency of the circuit in the corner 5 of the bag 1.

In order to read the data provided by the different data carrier devices 6 described thus far, it is necessary to provide activation means to emit a field suitable to cause the data carrier device 6 provided in the corner 5 of the bag 1 to emit data it is carrying, and also a receiving means for receiving the data thus emitted.

Figure 5:
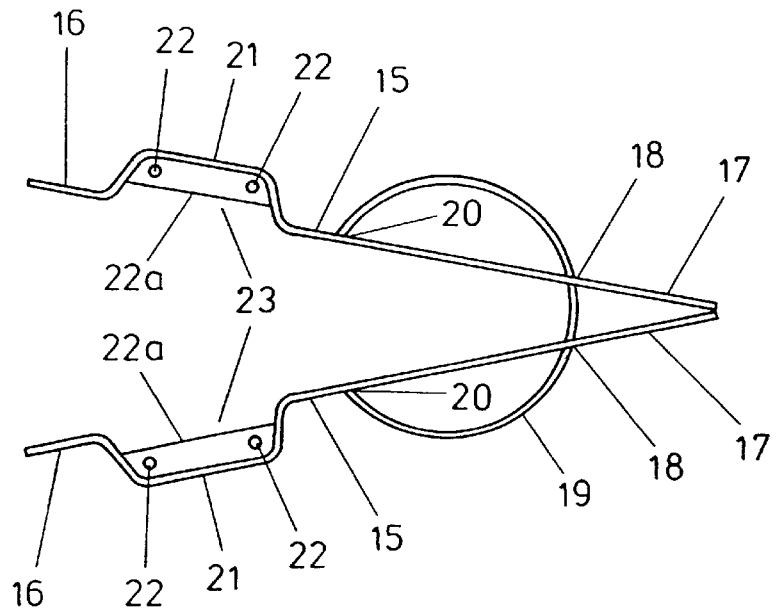
FIG. 5 shows a reading device clip in an open condition.
Figure 6:
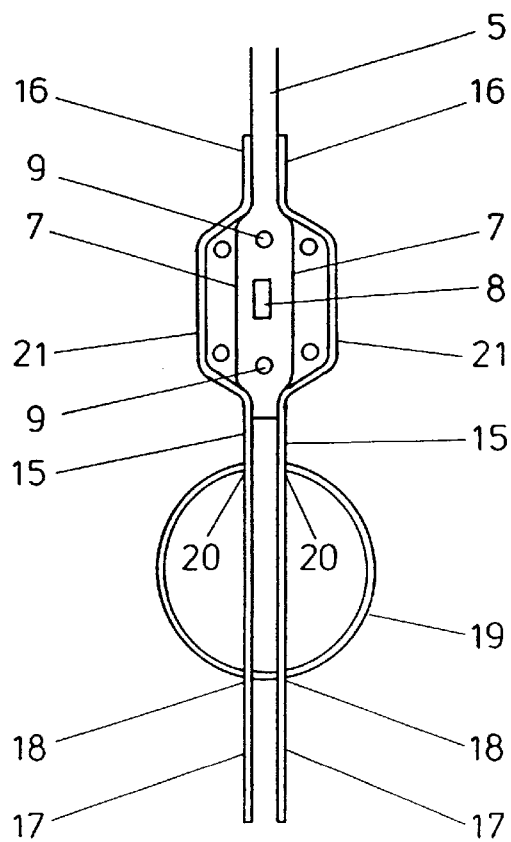
FIG. 6 shows the reading device clip when closed onto the reservoir of FIGS. 1 and 2.
Figure 7:
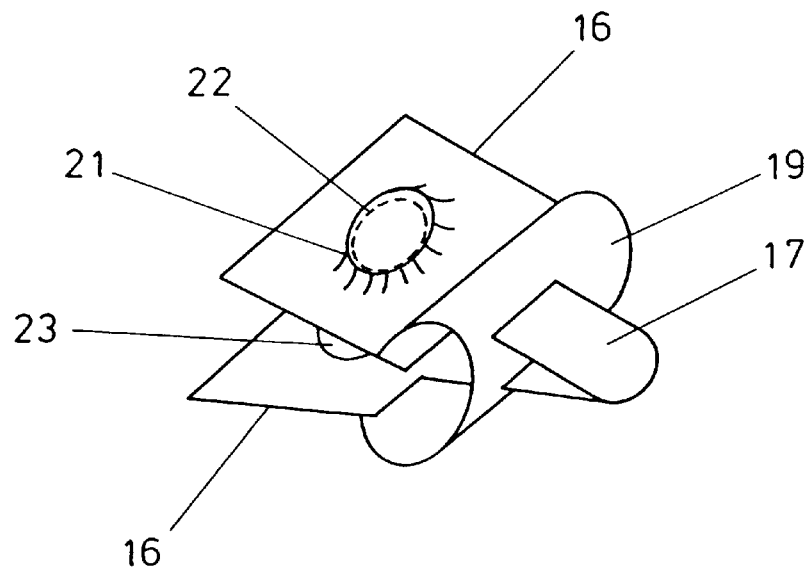
FIG. 7 is a perspective view of the reading device clip of FIGS. 5 and 6.

FIGS. 5, 6 and 7 show a spring clip reading device which may carry electrical coils of such activation and receiving means, and which may be clipped onto the corner 5 of the bag 1 in order to provide a simple and effective coupling to the data carrier device 6. FIGS. 5 and 6 show the clip in cross-section along a central line of the clip as seen in perspective (on a smaller scale) in FIG. 7.

Thus, the clip comprises two rigid grips 15 having spade-like gripping portions 16, narrowing down to actuating finger portions 17 as shown particularly in FIG. 7. The finger portions 17 project through slits 18 at one side of an almost fully cylindrical spring 19, having free ends 20 which urge the gripping portions 16 together so that, when the clip is at rest, the gripping portions 16 are in urging contact with each other (not shown).

Each gripping portion 16 is formed with a circular recess 21 wherein a coil 22 (shown in section in FIGS. 5 and 6) is encapsulated in resin 22a. The resin 22a does not fill the recess 21, but leaves a hollow 23 at the mouth of each recess 21. The coils 22 have electrical connections which are not shown but which will be apparent to the skilled man. A coil 22 is shown dotted in FIG. 7, although in practice it will not be visible.

The coils 22 are adapted appropriately to activate whichever of the two different types of data carrier device 6 as described hereinbefore with reference to FIG. 3 is employed, and to receive the data it thus emits.

FIGS. 5 and 7 show the clip wherein the actuating finger portions 17 are in a position which they would adopt when pressed together by the hand of an operator about to apply the clip to the corner 5 of bag 1, whilst FIG. 6 shows the clip after application to the corner 5 of the bag 1.

In FIG. 6 the spring 19 urges the gripping portions 16 together to grip securely the corner 5 of the bag 1, and the hollows 23 locate on the circular projections 7 formed on the corner 5 and provided on either side of the data carrier 6. Thus in the FIG. 6 situation the encapsulated coils 22 in the clip can cooperate fully with the data carrier device 6 to activate it and receive the data which is carried.

In this embodiment best results are achieved if the doctor or nurse properly locates the clip on the projections 7 as is intended and shown in FIG. 6, thereby to align properly the coils 9 and 22. This is assisted by the projections 7 and the mouths of the recesses 21 having rounded edges as shown, for ease of location of the projections 7 into those mouths.

Figure 8:
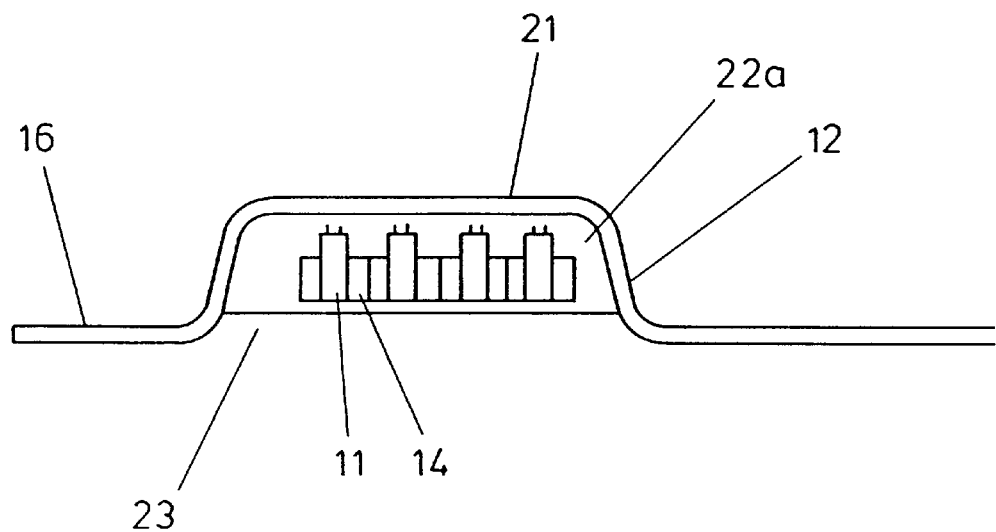
FIG. 8 shows a detail of a variation of the reading device clip.

FIG. 8 shows how the clip of FIGS. 5, 6 and 7 can be adapted to provide the reader 12 of the FIG. 4 embodiment, wherein the reader circuitry is provided in only one of the gripping portions 16 of the clip, for cooperation with that side of the corner 5 on which the label 10 is affixed. The other gripping portion 16 of the clip may merely be a flat piece of material, or alternatively the circuitry of FIG. 8 may be duplicated therein similarly to FIG. 8, so that the clip can be applied to the corner 5 either forwards or backwards.

The clip may be made from any appropriate material, including plastics. However, a more secure clip may be provided if the spring 19 is made of metal, to provide a stronger gripping action, and also electrical and magnetic screening for the coils 22 can be achieved if the grips 15 are both made of a suitable ferrous metal such as Mumetal.

In embodiments of the invention, physical contact of activation and reading means with the data carrier device 6 is not an essential requirement. Thus, in the embodiments just described, physical contact between the coils 9 and 22, or between the transducers 11 and the magnetic ink bars 13, does not take place owing to the encapsulation of the coils 9 and 22 and of the transducers 11. Therefore, although the reading device clip of FIGS. 5, 6 and 7 is to be clipped to the corner 5 of the bag 1, in alternative embodiments it may be possible for the data carrier device 6 to be activated and read by means which do not contact the bag 1 or other reservoir, and which may even be remote from the bag 1 or other reservoir.

Figure 9:
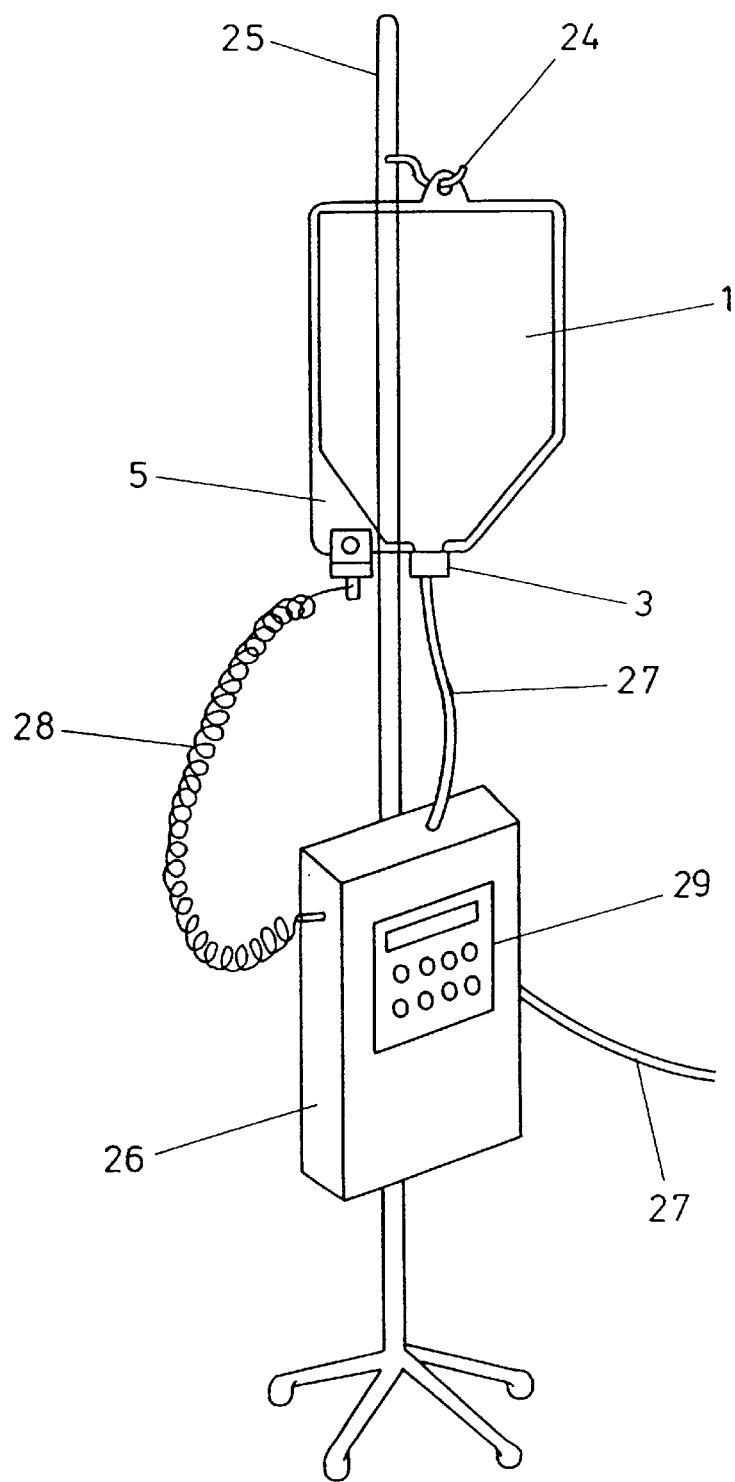
FIG. 9 shows a passive reservoir and delivery device set up for use.

FIG. 9 shows an installation of a bag 1 ready for use. The bag 1 hangs on a hook 24 of a vertical stand 25.

A delivery device 26 is also supported by the stand 25, below the bag 1, and is installed in a patient supply line 27 inserted in the outlet nozzle 3. The reading clip of FIGS. 5 to 7 is attached to the corner 5 of the bag 1 in a manner shown in FIG. 6, with the coils 22 of the clip coupled electrically to control means of the delivery device 26 via a flexible coiled lead 28. Details of connections between the coils 22 and the lead 28 are not shown, and will be apparent to the skilled man.

The delivery device 26 is a volumetric infusion pump including a microprocessor control means within the body of the delivery device 26 and comprising a keyboard and display 29. Various other switches and also alarm indicators are provided on the body of the delivery device 26, which will be apparent to the man skilled in the art and which are not shown here in detail.

When the delivery device 26 is operated, the data carrier device 6 in the corner 5 of the bag 1 is activated by activation means and thereby emits the data it is carrying. The data is received, and transmitted via flexible coiled lead 28 to the delivery device 26.

The delivery device 26 operates taking into account the data received from the bag 1 by receiving means and fed to the control means of the delivery device 26. If that data relates only to the medicament in the bag 1, the control means will need to be programmed fully by an operator using the keyboard and display 29, as regards for example delivery rate and delivery duration, or target blood concentration where appropriate.

Thus, it is envisaged that the emitted data will contain at least an identification of the medication contained in the bag 1 and/or its concentration, although this could be extended to include further data such as for example the batch number of the medicament and its expiry date. Alternative or additional data could be employed also.

Examples of volumetric infusion pumps are peristaltic pumps and reciprocating piston pumps. The delivery device 26 could alternatively be a drip feed controller. Such devices incorporate mechanically-operating actuating means for controlling the delivery of medicament from the bag 1 via the patient supply line 17. The man skilled in the art will be familiar with such actuating means, for example peristaltic mechanisms, piston mechanisms and line constriction mechanisms.

Thus, there are several forms of delivery device 26 which are commercially available and to which the present invention can be applied. The delivery device 26 can be particularly designed initially to be in accordance with the second aspect of the invention as defined hereinbefore, or an already-existing delivery device 26 can be adapted for the same purpose.

In addition to the various types of data carrier device or tag 6 already particularly described and illustrated with respect to FIGS. 3 and 4, as the result of a search for other technologies applicable to automatic reservoir identification as just described, a magnetostrictive system has emerged as another possibility. The system incorporates a tag 6 moulded into the bag corner 5 and a reading device (which both activates and receives) provided by the clip of FIGS. 5 to 7.

The tag is composed of a thin strip of "electrical" steel ribbon overlying a thin steel strip of hard magnetic steel of similar dimension. In the form envisaged, the strips are approximately 10 mm to 20 mm long and 2.5 mm wide. The combined thickness of the two strips is about 0.5 mm.

A tag constructed in the way described will resonate at radio frequencies when subjected to an incident magnetic (not electric) field at its resonant frequency, eg 100 KHz. The resonant frequency is primarily determined by the dimensions and composition of the electrical steel strip and the strength of its associated bias magnet. Thus by varying the length of the electrical alloy strip or the strength of the bias magnet, the resonant frequency may be preset according to the contents of the passive reservoir.

Electric power transformers are designed such that electrical energy in one winding is transferred to a second winding via a conversion to and from an "isolating" magnetic field constrained within a steel core. The efficiency of the transformer has a high dependence on the energy lost to the core during the conversion of the electrical energy into and out of the magnetic field. This energy is absorbed in eddy currents within the steel and elastic strains caused by the expansion and contraction of the magnetic domains within the atomic structure of the steel.

These strains act through the magnetostrictive effect, which is analogous to but smaller than the better known piezoelectric effect. To reduce the effects of eddy currents, the electrical resistance of the steel is increased with the addition of silicon. Thus transformer core steel is very efficient at conducting magnetism, enabling the low energy, magnetostrictive properties to be exploited in other applications.

The electric power transformer industry has dedicated much resource to improvements in the conversion efficiency of its products. In particular, improvement has been gained through the use of better materials in the transformer core. Eddy current losses have been reduced by increasing the resistance of the steel without reducing magnetic permittivity. Some of these high resistance, high permittivity steels exhibit significant magnetostriction making them suitable for use as resonators in the current application.

Figure 10:
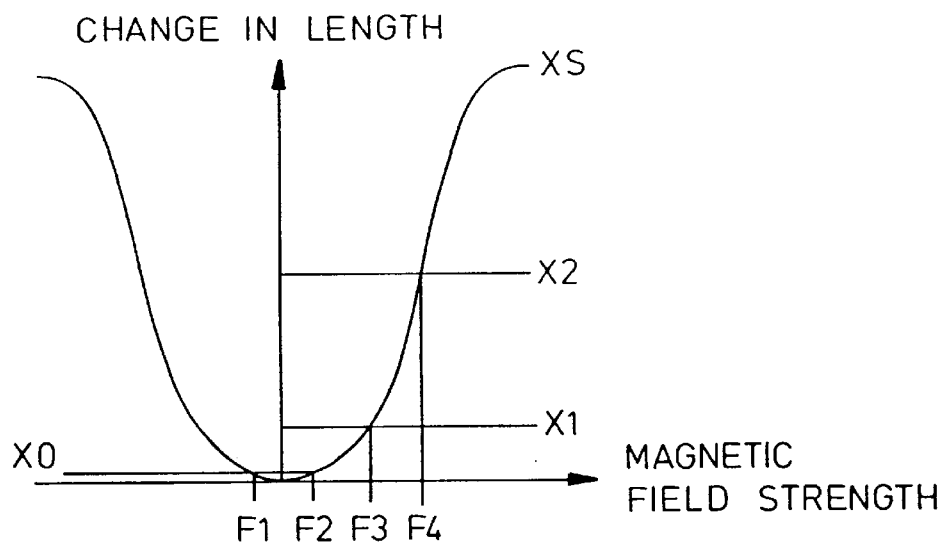
FIG. 10 shows the principle of the magnetostrictive effect employed in some embodiments of the present invention.

Referring to FIG. 10, the magnetostrictive effect is shown by an increase in the length of a steel ribbon when in the presence of a magnetic field. As the field strength is increased, so the ribbon's length increases to the point of saturation (XS). Thus under the influence of a field strength F3 the ribbon has extended by X1. Increasing the strength of the field to F4 further increases the length by X2.

The U shape of the curve indicates that when the field is reduced from F1 to zero, reversed and increased to F2, the ribbon will contract to a minimum length at a field strength of zero and extend again by X0 at a field strength of F2. Thus if the magnetostrictive property of the ribbon is to be exploited it should be held in a bias field of F4 such that it is on the steepest part of the curve. Under the influence of this bias field, the material's length will exhibit the greatest sensitivity to any changes in the incident magnetic field strength.

Two systems have been identified in particular which exploit the use of biased magnetostrictive materials and which can be exploited as potential data carrier devices in the form of identification markers for the bag 1. The first uses the fundamental resonant frequency of the magnetostrictive material steel strip and the second employs harmonics of that resonant frequency. Both systems use a steel strip of magnetostrictive material developed for the power transformer industry, biased with a strip of permanent magnet of similar dimensions. The two strips are sealed and held in a cavity within the bag corner 5, such that the magnetostrictive element can freely vibrate but is constrained to be in close proximity to or touching the bias magnet.

Figure 11:
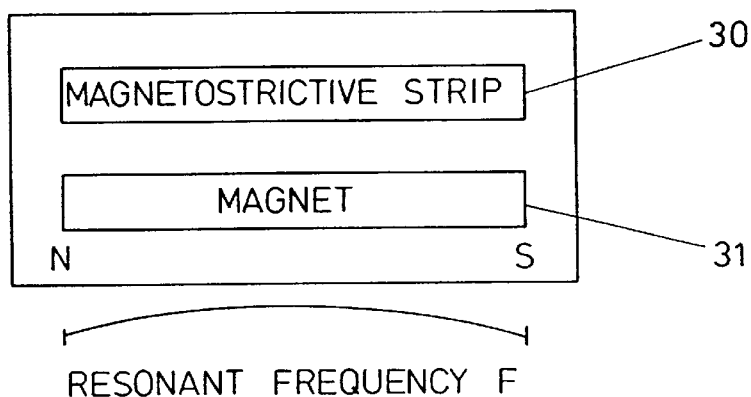
FIG. 11 explains the principle of a first magnetostrictive data carrier which may be used in embodiments of the present invention.

Fundamental Resonance System (FIG. 11)

The identification device consists of the two steel strips as described above. The steel alloy strip 30 is a magnetostrictive material biased to its sensitive region by the associated magnet 31. When the tag is subject to an incident, additional magnetic field, its length will change.

If the incident magnetic field produced by the activation means is varying in intensity, the tag will expand and contract in sympathy with the field. As the incident field frequency is increased in a scan of different frequencies, a frequency will be reached at which the tag mechanically resonates, expanding and contracting at an amplitude greater than would be attributable to the peak values of the incident field alone. This frequency is primarily determined by the dimensions of the magnetostrictive strip and its ductility. The resonance may be detected by the receiving means as described later.

FIG. 11 shows the standing wave that has formed in the magnetostrictive material at the resonant frequency F. At resonance there are null points (no deviation from the mean position) of the wave at the ends of the strip. Even harmonic frequency waves may also be excited which have nulls at the ends of the strip, although they will be of a smaller amplitude and easily discriminated from the fundamental frequency.

Figure 12:
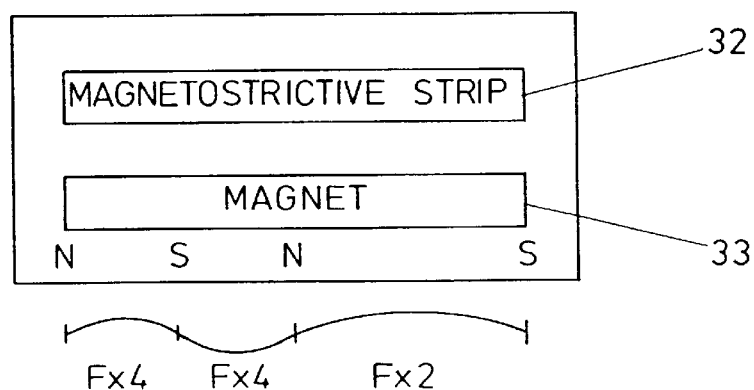
FIG. 12 shows the principle of a second magnetostrictive data carrier which may be used in alternative embodiments of the present invention.

Harmonic Resonance System (FIG. 12)

FIG. 12 shows how the standing wave would form in a magnetostrictive strip 32 biased with two magnets 33. The first is a ¼ of the length of the strip and the second ½ the length. In the proposed system the pairs of poles are "printed" on the same magnetic strip 33 in a similar manner to the way music is recorded on magnetic tape by cassette recorders. The manner in which this is achieved will be readily apparent to the man skilled in the art. The strip 32 will have the same fundamental resonance as the strip 30 in FIG. 11. However, in addition two strong harmonics may be excited at twice and four times the fundamental frequency. The two magnets 33 could of course alternatively be separate magnetic strips.

Similar to the fundamental resonance tag, this tag will resonate at its fundamental frequency as determined by its shape and ductility. However, in addition it may be programmed to resonate at chosen harmonic frequencies enabling information to be represented by the presence or absence of the different harmonics. More harmonics than those shown could be employed.

A fundamental resonance system as described has already been proposed for example in U.S. Pat. No. 4,510,490, while a harmonic resonance system has already been proposed also, for example in WO 92/12402. These previously proposed resonance systems could be employed in embodiments of the present invention.

Figure 13:
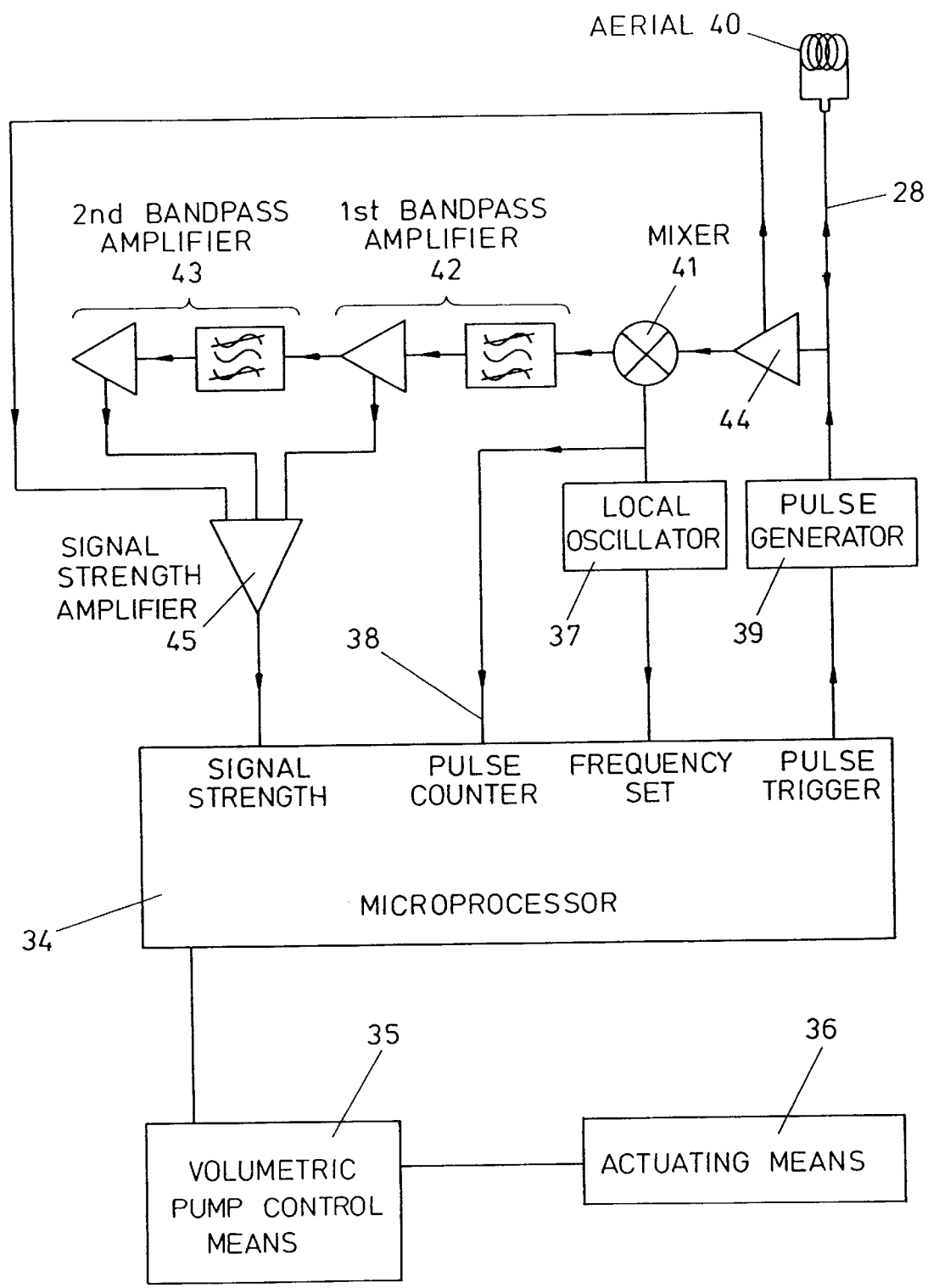
FIG. 13 shows an activating and receiving means for a delivery device which is cooperable with magnetostrictive data carriers.

Resonance Detection System (FIG. 13)

FIG. 13 shows a circuit designed to act as the activation means and the receiving means within the delivery device 26 and the clip of FIGS. 5, 6 and 7. It will detect the resonant frequencies of the two magnetostrictive tag systems described above, and employs the heterodyne principle of received signal processing.

A microprocessor 34 of the activation/receiving means is shown coupled to volumetric pump control means 35, which is in turn shown coupled to actuating means 36 within the delivery device 26, such as a peristaltic pump, a reciprocating piston pump, or a drip controller, any of which may operate on the patient supply line 27.

To eliminate set up costs during manufacture the microprocessor 34 calibrates the local oscillator frequencies of oscillator 37 at the "pulse counter" input 38, against its own quartz crystal clock each time the system is powered up. Following this self calibration, the microprocessor 34 will have access to a table of all the resonant frequencies of interest and the "frequency set" voltages required for the local oscillator to detect them.

Detection of a resonant frequency is initiated by the microprocessor 34 setting the appropriate local oscillator frequency and triggering a pulse from the pulse generator 39. The pulse will have a duration of half the period of the resonant frequency of interest. The current resulting from the pulse will cause a magnetic field to be formed around the aerial coil 40, which is mounted within the clip in close proximity to the tag 6 when the clip is applied to the corner 5 of the bag 1.

In response to the magnetic pulse, the magnetostrictive element of the tag 6 will distort and relax. However, if the pulse duration is ½ the wavelength of a resonant frequency, the tag will continue to resonate after the pulse. The vibration of the magnetostrictive element within the magnetic field of its bias magnet will cause a very weak, oscillating magnetic field to be emitted from the tag.

This weak field will generate a current in the aerial 40 which is amplified and fed to the mixer stage 41 of the detector. The mixer 41 will produce the difference frequency of the received signal and the local oscillator 37. The difference frequency is fed to a two stage, very narrow, bandpass amplifier 42, 43. Thus by choosing the appropriate local oscillator frequency, the difference frequency should be the centre frequency of the bandpass amplifiers 42, 43. Any signal received by the aerial 40 of the correct frequency will receive significant amplification by amplifier 44. A signal is taken from each of the three amplifiers 42, 43, 44 to the signal strength amplifier 45. The resultant signal strength is fed back to the microprocessor 34.

By comparing the signal strength before the pulse (but after the local oscillator frequency has been set) with that immediately following the pulse, the microprocessor 34 can be programmed to determine whether a resonance was present. The process is repeated for each frequency of interest.

The activating and receiving system described above is not the simplest implementation possible. Simpler systems could be developed which utilise separate transmit and receive coils enabling continuous transmission of the exciting field. This method is used in shop door security systems. Thus the aerial 40 can comprise separate transmit and receive coils 22 provided in the two respective sides of the reading clip, as shown in FIGS. 5 and 6.

Each detected resonance or harmonic may provide one item of information. Thus, for example, detection of two different fundamental resonances from two strip devices according to FIG. 11 could provide an identification of a particular medicament and its concentration, as could the detection of say a fundamental resonance and a harmonic, or two harmonics, from a single strip according to FIG. 12.

It is also possible to extend the systems of FIGS. 11 and 12 so that more data could be carried by a tag (device 6). Thus a tag could comprise multiple pairs of strips as shown in FIG. 11 or FIG. 12, with each pair having a different length compared to the other pair. Thus, a fundamental resonance system (FIG. 11) thus adapted could have a number of different length pairs of strips, different combinations of which could represent different items of data. A similarly adapted harmonic resonance system (FIG. 12) could be significantly enhanced, with many combinations of harmonics being available to carry extra items of data and provide error checking.

For safety, the data carrier device 6 should not be insertable into a medicament reservoir by the user, and moreover should not be reusable to reactivate the delivery device after the reservoir has been emptied.

To assist in achieving this, the data carrier device and any connections should be embedded within their surrounding material, preferably by moulding or encapsulation.

Also, the data carrying device could be adapted to be incapacitated after one use. In the case of the transponder, it or the delivery device could be programmed to achieve this. The magnetostrictive tags could have their bias magnets demagnetised by generating a suitable field around the detector aerial. The ability to demagnetise the bias magnet will require a specific choice of material for the bias magnet if erasure is not to occur during transport or storage and yet is not to require impractical demagnetising field strengths. The man skilled in the art will be able to make this choice of bias magnet material in dependence upon the particular requirements of any particular embodiment.

It has however been found that a particularly suitable material for the magnetostrictive strip is Metglas (trade mark) 2605 in most embodiments.

These measures are intended to limit the potential for misuse of either a pre-filled reservoir for medicament or a cooperable delivery device. For example, the pre-filled reservoir should not be reused with an alternative medicament, or even re-used with a re-filling of the original medicament.

Moreover the computer controlled delivery device should not be used with an alternative medicament and/or an inappropriate mathematical model incorporated in its programming.

Although a plurality of data carrier means activatable by suitable fields have been specifically disclosed herein, it is to be understood that the present invention is not restricted to these. Any electrically and/or magnetically operable device suitable for the indicated purpose may be employed in embodiments of the present invention. In particular, it is to be understood that the operation of the data carrier means need not be wholly electrical and/or magnetic, and thus for example optical and/or acoustic elements may be employed in conjunction with electrical and/or magnetic devices in alternative embodiments.

It is further to be understood that the invention is not restricted to magnetic and/or electrical fields to be put into practice. Any other type of field (electromagnetic or otherwise) which is suitable to activate a cooperable data carrier means in accordance with the present invention can be employed. Thus, in alternative embodiments of the invention for example fields comprising radiation anywhere within the electromagnetic spectrum may be employed, and also other fields such as acoustic or other non-electromagnetic fields may be employed in suitably adapted embodiments.

Further, although a preferred location for the data carrier means has been disclosed to be in the corner of a collapsible bag, it is to be understood that this is a non-limiting example.

I claim:

1. A passive reservoir for containing a medicament to be supplied to a patient through a supply line controlled by a delivery device that is separate from the passive reservoir, said passive reservoir comprising:

an electrically and/or magnetically operable data carrier means for carrying data relating to a medicament contained in or to be contained in said reservoir, the data carried by said data carrier means providing at least partial control of the delivery device, said data carrier means comprising a resonant device adapted to resonate at at least one predetermined resonant frequency representative of medicament-related data, when activated by an activating field generated by an external field generating means, to thereby emit the medicament-related data.

2. A passive reservoir according to claim 1, wherein the resonant device is a magnetically operable magnetostrictive device.

3. A passive reservoir according to claim 2, wherein the magnetostrictive device comprises one or more elements of magnetically biased material, which will mechanically resonate when activated by an external source of a suitable magnetic field.

4. A passive reservoir according to claim 3, wherein the magnetostrictive device comprises one or more strips of magnetostrictive material biased with one or more strips of permanent magnet.

5. A passive reservoir according to claim 2, wherein the magnetostrictive device is adapted to resonate at one or more fundamental frequencies.

6. A passive reservoir according to claim 2, wherein the magnetostrictive device is adapted to resonate at one or more harmonic frequencies.

7. A passive reservoir according to claim 1, wherein the resonant device is an electrically operable resonant circuit comprising inductance and comprising inductance and capacitance.

8. A passive reservoir according to claim 1, wherein the data carrier means comprises an aerial means to receive said activating field and to emit the carried data.

9. A passive reservoir according to claim 1, wherein the data carrier means is adapted to be incapacitated after one use so that the passive reservoir cannot be reused.

10. A passive reservoir according to claim 1, including a plurality of said data carrier means.

11. A passive reservoir according to claim 1, wherein said data carrier means is embedded within surrounding material of which the passive reservoir is constructed.

12. A passive reservoir according to claim 1, which is pre-filled with medicament.

13. A passive reservoir according to claim 1, which is empty.

14. A passive reservoir according to claim 2, wherein said medicament-related data identifies the concentration of medicament contained or to be contained in the passive reservoir.

15. A delivery device for use with a passive reservoir containing a medicament to be administered to a patient through a patient supply line leading from the passive reservoir to the patient, the passive reservoir including an electrically and/or magnetically operable data carrier means for carrying data relating to the medicament contained in the passive reservoir, the data carrier means including a resonant device adapted to resonate at at least one predetermined frequency representative of medicament-related data, when activated by an activating field, to thereby emit the medicament-related data; said delivery device being located separately from the passive reservoir and comprising:

activation means to emit the activating field;

receiving means for receiving data emitted by said resonant device;

actuating means for controlling delivery of medicament to the patient by controlling medicament flowing through the patient supply line from the passive reservoir to the patient; and control means coupled to said receiving means and to said actuating means to operate said actuating means on the basis of data received by said receiving means from the resonant device, wherein said activation means is constructed and arranged to produce a signal which will cause said resonant device of said data carrier means on said passive reservoir to resonate, and said receiving means is operable to detect such resonance.

16. A delivery device according to claim 15, wherein the activation means is operable to produce a magnetic pulse to cause a magnetically operable magnetostrictive device to resonate mechanically at one or more frequencies.

17. A delivery device according to claim 15, wherein the activation means is operable to produce a signal to cause an electrically operable resonant circuit comprising inductance and capacitance to resonate.

18. A delivery device according to claim 15, wherein said control means is adapted to incapacitate the data carrier means such that the passive reservoir can be used only once.

19. A delivery device according to claim 15, further comprising a reading device comprising at least a part of said activation means and at least a part of said receiving means.

20. A method for automatically identifying a medicament or a property of a medicament comprising:

providing a passive reservoir which contains or is to contain the medicament;

providing an electrically and/or magnetically operable data carrier means on said passive reservoir to emit data carried by said data carrier means, the data carrier means comprising a resonant device adapted to resonate at at least one predetermined frequency representative of medicament-related data carried by said data carrier means when activated by an activating field generated by an external field generating means;

generating the activating field with the external field generating means to cause the resonant device to resonate at the predetermined frequency, to thereby emit the medicament-related data; and identifying the medicament or said property thereof by reading the medicament-related data emitted by the resonant device of the data carrier means.

21. A reading device for use with a passive reservoir for supplying a medicament to a patient through a supply line controlled by a delivery device separate from the passive reservoir, the delivery device being controlled by an electrically and/or magnetically operable data carrier means provided on the passive reservoir for carrying data relating to the medicament contained in the passive reservoir, the data carrier means including a resonant device adapted to resonate at at least one predetermined frequency representative of medicament-related data, when activated by an activating field, to thereby emit the medicament-related data; said reading device comprising:

at least a part of an activating field generating means for generating the activating field to cause the resonant device to resonate at the predetermined frequency to emit the medicament-related data; and at least a part of a receiving means for receiving the medicament-related data emitted by the resonant device, wherein activating field generating means is operable to produce a signal which will cause said resonant device of said data carrier means on said passive reservoir to resonate, and said receiving means is operable to detect such resonance.

22. A delivery system comprising:

a passive reservoir containing a medicament;

electrically and/or magnetically operable data carrier means for carrying data relating to the medicament contained in said passive reservoir and including a resonant device adapted to resonate at at least one predetermined frequency representative of medicament-related data, when activated by an activating field, to thereby emit the medicament-related data;

a patient supply line leading from said passive reservoir to carry medicament to a patient; and a delivery device located separately from said passive reservoir and comprising:

activation means to emit the activating field;

receiving means for receiving data emitted by said resonant device;

actuating means for controlling delivery of medicament to a patient by controlling medicament flowing through said patient supply line from said passive reservoir to the patient; and control means coupled to said receiving means and to said actuating means to operate said actuating means on the basis of data received by said receiving means from said resonant device, wherein said activation means is constructed and arranged to produce a signal which will cause said resonant device of said data carrier means on said passive reservoir to resonate, and said receiving means is operable to detect such resonance.